Aug. 25, 1931.     I. DROWNS     1,820,056
BORING TOOL HOLDER
Filed March 19, 1928
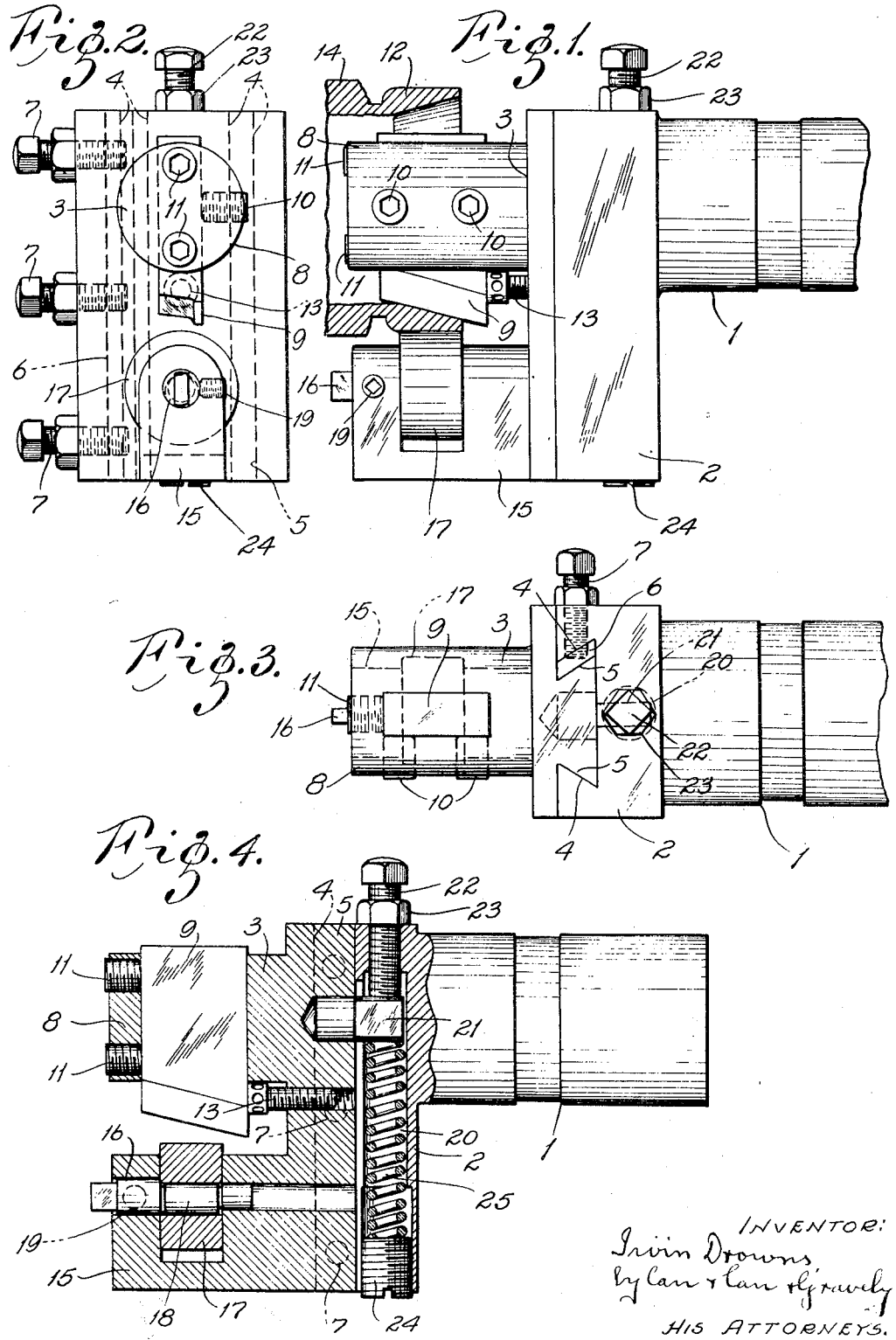

Patented Aug. 25, 1931

1,820,056

UNITED STATES PATENT OFFICE

IRVIN DROWNS, OF CANTON, OHIO, ASSIGNOR TO THE TIMKEN ROLLER BEARING COMPANY, OF CANTON, OHIO, A CORPORATION OF OHIO

BORING TOOL HOLDER

Application filed March 19, 1928. Serial No. 262,732.

My invention relates to holders for boring tools, that is, reamers, cutters and the like for operating on the interior of tubular articles. The invention has for its principal object to insure that the portion of the interior of the work operated on by the tool shall be concentric with the outside surface of the work.

The invention consists principally in mounting the tool in a holder that has a portion overhanging the outside of the work, a work engaging roller being mounted in said work overhanging portion of said holder, whereby the tool is made to follow the outside surface of the work. The invention further consists in the boring tool holder and in the parts, combinations and arrangements of parts hereinafter described and claimed.

In the accompanying drawings,

Fig. 1 is a side elevation of a boring tool holder embodying my invention, the work being shown in section, Fig. 2 is an end elevation, Fig. 3 is a top plan view; and Fig. 4 is a vertical sectional view.

A supporting stem 1 is adapted for mounting in a lathe or other suitable machine. Said stem 1 is provided with a suitable body 2 that is the carrier or support for the tool holder proper 3. Said carrier 2 has undercut jaws 4 constituting a slideway for the cooperating slide portion 5 of said tool holder 3. A gib 6 is interposed between one of the jaws 4 and the slide 5 and set screws 7 are provided for adjusting the pressure of said gib 6 against the slide 5.

The tool holder 3 has a projecting stem 8 in which is mounted a tool 9, as a cutter or reamer blade. Set screws 10 are provided in the side of said tool mounting stem 8 to hold the tool 9 in position; and screws 11 may also be mounted in the end of the stem 8 to engage the edge of the cutting tool 9.

The cutting tool 9 extends into the tubular work 12, the work being mounted in a suitable work support (not shown in the drawings). A screw 13 mounted in the tool holder 3 engages the edge of the tool 9 so as to hold it firmly against the work 12. The work shown in the drawings is a cup or outer bearing member for taper roller bearings; and the tool 9 is shown as working on the conical bore of said cup. Said cup 12 is illustrated as still being integral with the tubular stock 14 from which it is made.

The tool holder 3 has a projecting arm 15 that overhangs the end of the work 12. Rotatably mounted on a pin 16 in said overhanging portion 15 of the tool holder 3 is a roller 17 that is adapted to engage the outside of the work. Said roller is mounted on an eccentric portion 18 of said pin, so that the roller may be adjusted within small limits by turning said pin 16. A set screw 19 is provided for holding the pin in adjusted position.

The body of the carrier 2 is provided with a longitudinal bore 20 into which extends a projecting pin 21 secured to the slide portion 5 of the tool holder 3. In one end of the carrier 2 and extending into the end of said bore 20 is an abutment screw 22 that is provided with a lock nut 23. Interposed between said pin 21 and a screw plug 24 in the other end of the carrier bore is a spring 25 that tends to hold said pin 21 against said abutment screw 22, thereby holding the guide roller against the outer surface of the work 12.

In the operation of the device, the tool 9 is fed toward the work 12 (or vice versa), one or both members being rotated. The guide roller 17 engages the outside of the work and, as the tool cuts deeper and deeper into the work, the guide roller passes further on to the body of the work. The relative rotation of the work and tool causes the guide roller to travel over the outside of the work, which portion of the work has already been given a smooth finish. Any irregularity or variation in the surface of the work will cause a movement of the roller and tool holder, thus causing the tool to be given a movement corresponding to the irregularity or variation in the outside surface of the work. Thus, the tool will finish the bore of the work exactly concentric with the outside surface of the work. By reversing the tool and guide roller portions the tool might be made to finish the outside of the work concentric with the bore.

Obviously any desired kind of cutting tool may be used and numerous changes may be made without departing from the invention; and I do not wish to be limited to the precise construction shown.

What I claim is:

1. A boring tool holder comprising a carrier adapted to be mounted in a machine, a tool holder yieldably mounted in said carrier, said tool holder having a portion adapted to extend into the work, a tool rigidly mounted in said projecting portion, said tool holder having a projecting portion overhanging the outer surface of the work and a guide roll mounted in said projecting portion and engaging a portion of the outer surface of the work.

2. A boring tool holder comprising a carrier adapted to be mounted in a machine, a tool holder movable in said carrier, a tool mounted in said tool holder for operating on the bore of the work, said tool holder having a projecting portion overhanging the outer surface of the work, a guide roll mounted in said projecting portion and a spring in said carrier disposed, transversely of the work engaging a portion of said tool holder to cause said roll to engage the outer surface of the work.

3. A boring tool holder comprising a carrier adapted to be secured in a machine and having undercut jaws constituting a slideway, a tool holder having a slide portion mounted in said slideway, a pin secured to said tool holder and projecting into a bore provided therefor in said carrier, an abutment for said pin extending into one end of said bore, a spring in the other end of said bore bearing against said pin to force it against said abutment, a tool supporting stem on said tool holder, a tool rigidly mounted in said supporting stem, a projecting portion on said tool holder overhanging the outer surface of the work, a pin mounted in said projecting portion, and a work engaging roller mounted on said pin.

4. A boring tool holder comprising a carrier adapted to be secured in a machine and having undercut jaws constituting a slideway, a tool holder having a slide portion mounted in said slideway, a pin secured to said tool holder and projecting into a bore provided therefor in said carrier, an adjustable abutment for said pin extending into one end of said bore, a spring in the other end of said bore bearing against said pin to force it against said abutment, a tool supporting stem on said tool holder, a tool rigidly mounted in said supporting stem, a projecting portion on said tool holder overhanging the outer surface of the work, a pin mounted in said projecting portion, said pin having an eccentric portion and a work engaging roller mounted on said eccentric portion of said pin.

Signed at Canton, Ohio, this 15th day of March, 1928.

IRVIN DROWNS.